United States Patent [19]
Forni

[11] Patent Number: 5,637,942
[45] Date of Patent: Jun. 10, 1997

[54] AERODYNAMIC DRAG REDUCTION ARRANGEMENT FOR USE WITH HIGH SPEED ROTATING ELEMENTS

[75] Inventor: Ronald J. Forni, Littleton, Mass.

[73] Assignee: Arthur D. Little, Inc., Cambridge, Mass.

[21] Appl. No.: 324,583

[22] Filed: Oct. 18, 1994

[51] Int. Cl.$^6$ ................................................ H02K 17/00
[52] U.S. Cl. .......................... 310/166; 310/51; 310/254; 310/261
[58] Field of Search ........................... 310/45, 51, 166, 310/171, 211, 254, 261, 267, 160, 161, 172

[56] References Cited

U.S. PATENT DOCUMENTS

| | | | |
|---|---|---|---|
| 3,500,092 | 3/1970 | Heilmann et al. | 310/172 |
| 4,514,150 | 4/1985 | Hiraga et al. | 417/440 |
| 4,815,951 | 3/1989 | Kakuda et al. | 418/15 |
| 4,927,339 | 5/1990 | Riffe et al. | 418/55 |
| 4,936,756 | 6/1990 | Shimizu et al. | 417/371 |
| 5,473,211 | 12/1995 | Arkkio | 310/262 X |

FOREIGN PATENT DOCUMENTS

| | | |
|---|---|---|
| 62-126284 | 6/1987 | Japan . |
| 3-96678 | 4/1991 | Japan . |

*Primary Examiner*—Mark O. Budd
*Attorney, Agent, or Firm*—Bacon & Thomas

[57] ABSTRACT

An aerodynamic drag reduction arrangement for use in a mechanical device that incorporates a high speed rotating element includes a boundary layer control member that defines a control surface. The control member is positioned adjacent the rotating element so as to optimize the clearance therebetween in order to effectively block axial flow and prevent radial pumping in order to minimize power consumption. The aerodynamic drag reduction arrangement is particularly adapted for use in electric rotors and scroll fluid devices.

12 Claims, 5 Drawing Sheets

AERODYNAMIC DRAG REDUCTION ARRANGEMENT FOR USE WITH HIGH SPEED ROTATING ELEMENTS

BACKGROUND OF THE INVENTION

1. Field of the Invention

The present invention pertains to an aerodynamic drag reduction arrangement for use with high speed rotating elements and functions to reduce momentum transfers from a boundary layer established by a rotating element to a boundary layer established by a fixed element.

2. Related Background Technology and Art

Any mechanical device having a relative smooth dement that rotates in a fluid medium at a high speed generates a centrifugal flow of ambient fluid radially outwardly from the axis of rotation of the element due to the friction between the ambient fluid and the rotating mechanism, such flow being conventionally referred to as "windage." An element rotating at high speed in a dense fluid can experience a high mechanical power loss from windage drag. Generally speaking, the power input necessary to rotate a disc, for example, is proportional to the rpm of the rotating disc to the third power, the density of the fluid, the disc diameter to the fifth power, a drag coefficient which depends upon the specific geometry of the disc and the disc's Reynolds Number. The viscosity of the fluid will determine whether the flow pattern is laminar or turbulent, and will affect the thickness of the boundary layer associated with the rotating element. However, it should be noted that doubling viscosity will not double the necessary power input.

In the case of a rotating disc, the primary source of drag is from axial fluid flow entering the rotating boundary layer. As soon as the fluid enters the rotating boundary layer, the fluid is pumped radially by centrifugal forces. The result is a large axial mass flow which is accompanied by a significant momentum transfer and drag. Associated with the drag and momentum transfer, there is also heat transfer. Therefore, a reduction in drag on a rotating element will result in a reduction of heat transfer as well.

Typical environments in which the drag reduction arrangement of the present invention can be utilized to significantly reduce power consumption is electric motors and scroll fluid devices. FIG. 1 shows a typical construction of a known electric motor which includes a rotating shaft 1 that is rigidly connected to a rotating motor rotor 2. A fixed stator 3 surrounds rotor 2 and is typically formed with a plurality of circumferentially spaced slots 4 adapted to accept motor windings (not shown). Rotating shaft 1 can be journaled in a bearing 5 as is well known in the art. The radial distance typically provided between rotor 2 and stator 3 permits the axial flow and radial pumping discussed above, thereby reducing the efficiency of the electric motor by increasing the power consumption thereof.

It is well known in the art of rotating scroll fluid devices that the inertial forces of an orbiting scroll must be balanced by a rotating counterweight. As shown in FIG. 3 herein, a typical counterweight 10 is rigidly secured to a rotating shaft and comprises a dense, non-symmetric rotating mass. If used in a high speed scroll fluid device, rotating counterweight 10 can also develop axial mass flow and resulting radial pumping so as to develop significant momentum transfer and drag on the scroll fluid device.

Finally, by way of an additional example, the drag reduction arrangement of the present invention can also be used in a co-rotating scroll fluid device using opposed, meshed, axially extending, co-rotating involute wraps that experience relative orbital movement without rotating relative to each other. When such a scroll fluid device is operated at increasingly higher speeds and efficiency of the device becomes a paramount consideration, aerodynamic drag resulting from the centrifugal flow of ambient fluid generated during operation of the device must be reduced in order to minimize power consumption. If such a scroll fluid device operates as compressor, an inlet port area is provided at an outer radial zone between the meshed involute wraps. In order to minimize power consumption, it is desirable that the fluid entering the inlet port area should have as little angular momentum induced by the rotation of the co-rotating involute wraps as possible.

Therefore, them exists a need in the art for a drag reduction arrangement for use in a mechanical device including a high speed rotating element in order to minimize power consumption of the device and increase operational efficiency.

SUMMARY OF THE INVENTION

The present invention provides an aerodynamic drag reduction arrangement for use in a mechanical device that incorporates a high speed rotating element (greater than 3600 RPM). The aerodynamic drag reduction arrangement comprises a boundary layer control element that defines a control surface. The control member is positioned adjacent the rotating element so as to optimize the clearance therebetween in order to effectively block axial flow and prevent radial pumping. The aerodynamic drag reduction arrangement of the present invention is particularly adapted for use in electric motors and scroll fluid devices where maximum efficiency is desired.

In the preferred embodiments, the boundary layer control member is positioned adjacent the rotating element such that there is only one boundary layer between the rotating element and the control member since, as this offset distance is increased from an optimum distance, an abrupt rise in power consumption, i.e. the necessary input power to maintain the desired operational speed and output, will occur from the formation of multiple boundary layers. If multiple boundary layers are permitted, one of these boundary layers will be positioned directly adjacent the rotating element and will be pumped radially. The other boundary layer will also flow radially while feeding the first boundary layer with axial flow, thereby requiting an increase in power supplied to the rotating element in order to maintain its desired operational speed and output. If the offset distance between the boundary layer control member and the rotating element is decreased from the optimum clearance value, the arrangement would act as a bearing and again an increase in power consumption would be required, mainly due to viscous shear effects.

Therefore, it is extremely important that the boundary layer control surface be offset from the rotating element by an optimum amount or as close to such mount as practically possible to effectively block the axial flow and radial pumping of ambient fluid. When incorporated in an electric motor, the boundary layer control member is positioned between the rotor and stator of the motor where windages losses are typically significant. When used for minimizing aerodynamic drag of a rotating counterweight in a scroll fluid device, the counterweight, which generally extends about an asymmetric portion of a rotating shaft, is provided with a filler material so as extend symmetrically about the shaft. The boundary layer control member then substantially encapsulates this filled counterweight with a predetermined clearance between the counterweight and the control member. When used in a co-rotating scroll environment, the boundary layer control member encapsulates the co-rotating scroll elements. In addition, the boundary layer control member includes radially extending holes adjacent an outer radial fluid port associated with the scroll fluid device in order to permit fluid flow through the control member for compression by the scroll fluid device. The perforated control member would also permit exiting of fluid from the scroll fluid device if the device is acting as an expander.

Additional features and advantages of the present invention will become more readily apparent from the detailed description of preferred embodiments thereof when taken in conjunction with the following drawings.

DETAILED DESCRIPTION OF THE PREFERRED EMBODIMENTS

Figure 1A:
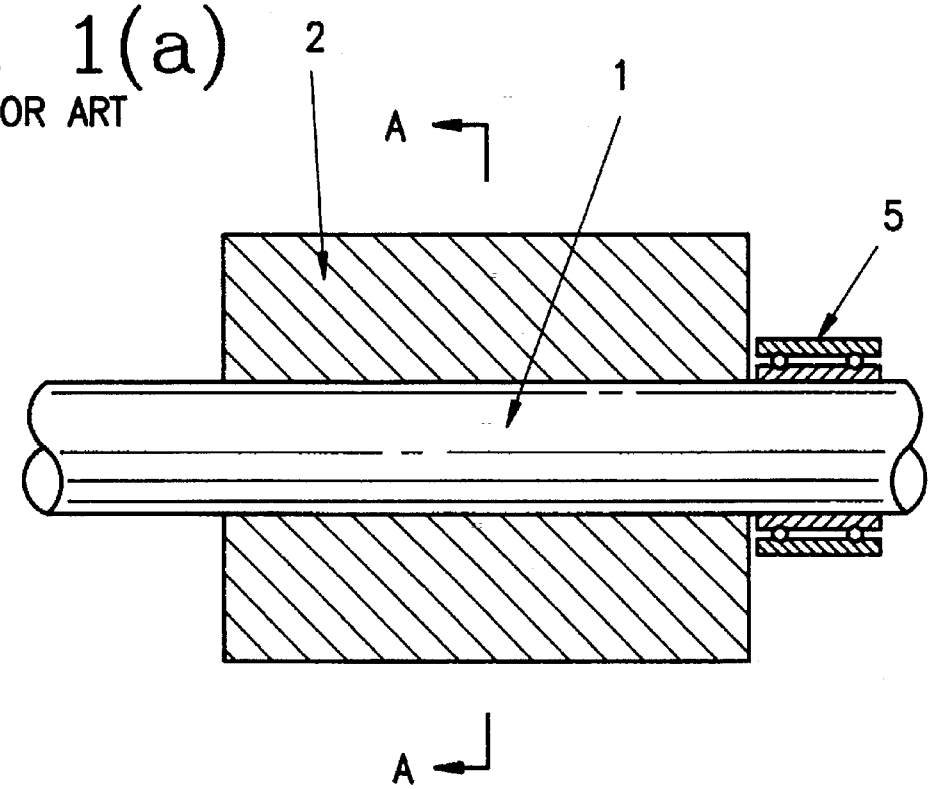
FIG. 1(a) is a partial, cross-sectional schematic view of a portion of an electric motor constructed in a manner known in the art.
Figure 1B:
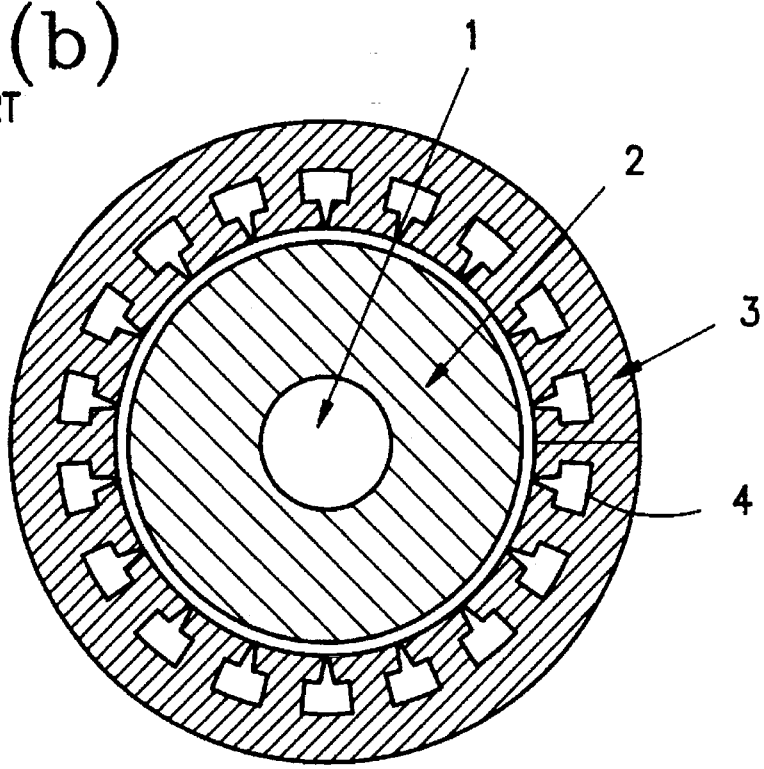
FIG. 1(b) is a cross-sectional view generally taken along line A—A in FIG. 1 (a) but including a fixed stator of the prior art electric motor.
Figure 2A:
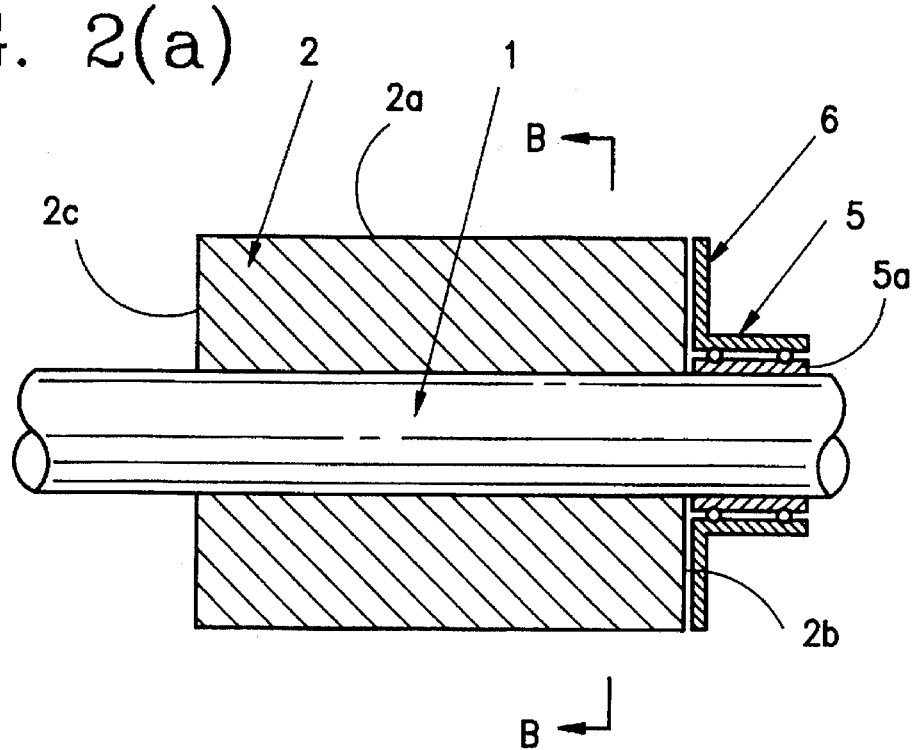
FIG. 2(a) is a partial, cross-sectional view of a portion of an electric motor incorporating an aerodynamic drag reducing arrangement according to a first embodiment of the invention.
Figure 2B:
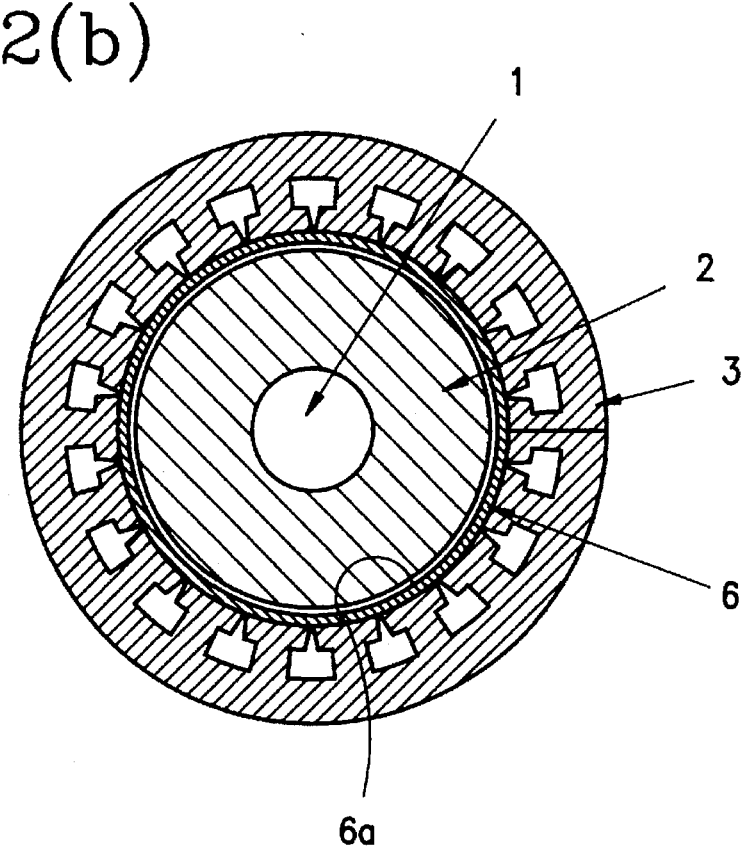
FIG. 2(b) is a cross-sectional view taken generally along line B—B of FIG. 1 but also depicting a fixed stator portion of the electric motor.

Initial reference will be made to FIGS. 2(a) and 2(b) in describing a drag reduction arrangement according to a first embodiment of the invention. This drag reduction arrangement is incorporated in an electric motor which, as described above with reference to FIGS. 1(a) and 1(b), generally includes a rotating shaft 1 that is rigidly connected to a rotating motor rotor 2.

A fixed stator 3, which surrounds rotor 2 is provided with a plurality of slots 4 adapted to accept motor windings (not shown). Shaft 1 is journaled in a bearing unit 5. The drag reduction arrangement of the present invention constitutes a boundary layer control member 6 that is positioned between rotor 2 and stator 3. Boundary layer control member 6 includes an inner peripheral, radially spaced surface 6a that functions to reduce the clearance between rotor 2 and stator 3 so as to reduce drag. In the preferred embodiment shown, boundary layer control member 6 is generally cylindrical in shape and is adapted to extend along the entire length of rotor 2. As best shown in FIG. 2(b), boundary layer control member 6 also covers slots 4 which, in themselves, can also generate a large amount of drag.

As shown, boundary layer control member 6 is offset from an outer peripheral, radially spaced surface 2a of rotor 2. Boundary layer control member 6 further extends along axially spaced radially extending surfaces 2b and 2c of rotor 2 as shown at 7. In the preferred embodiment wherein bearing 5 is located closely adjacent to surface 2b of rotor 2, boundary layer control member 6 is rigidly attached to the non-rotating member 5a of bearing 5.

Figure 6:
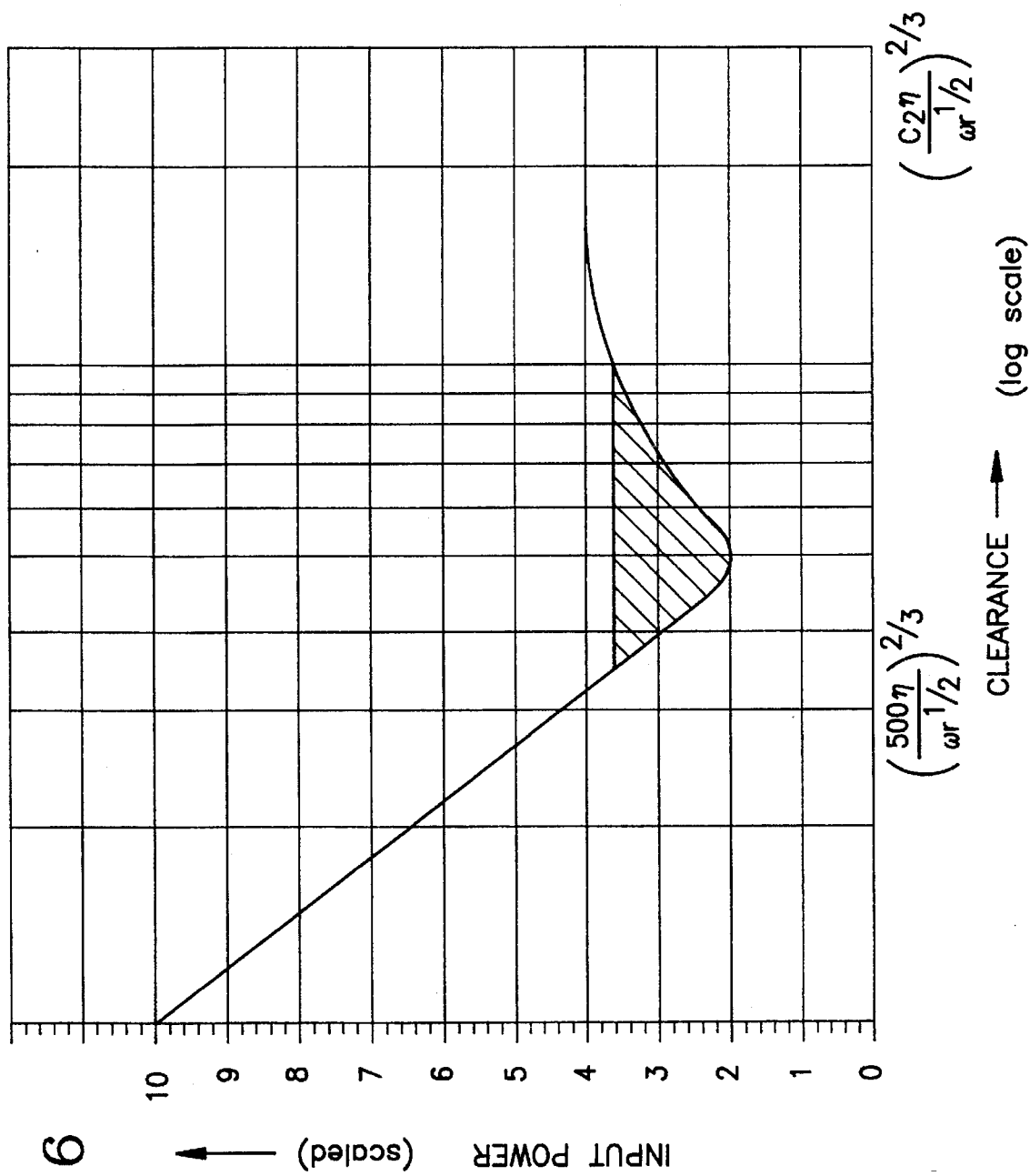
FIG. 6 is a graph depicting the relationship between necessary shaft input power versus boundary layer control surface clearance between a rotary member and a fixed member.

It should be recognized that by this arrangement boundary layer control member 6 restricts the axial flow into a rotating boundary layer developed during operation of the electric motor so as to restrict radial pumping and thereby reduce drag. In conventional electric motor designs, the gap between the motor and the stator is somewhat arbitrarily sized. Boundary layer control member 6 is placed between rotor 2 and stator 3 at an optimal distance and control surface 6a is preferably smooth. In general, any potential device incorporating the drag reduction arrangement of the present invention will evince a necessary power input vs. control member clearance exemplified by the graph shown in FIG. 6. Acceptable data is obtained in accordance with the present invention if the control member has an associated clearance in the shaded range. In general, this range must be controlled to prevent abrupt increases in necessary power input requirements and an optimum clearance, indicated by the lowest point on the curve, can be readily determined experimentally. This optimum clearance will depend on the particular geometry of the device as well as its environment of use. More specifically, this clearance (d) is within the range defined by the formula:

$$\left(\frac{C_1 \eta}{\omega r^{1/2}}\right)^{2/3} < d < \left(\frac{C_2 \eta}{\omega r^{1/2}}\right)^{2/3}$$

wherein:
d=clearance between control surface and the rotating member (ft.)
$\eta$=viscosity of fluid within which the member rotates (ft$^2$/sec)
$\omega$=angular velocity of the rotating member (rad/sec)
r=radius of the rotating member (ft)
$C_1$=500 (non-dimensional Taylor number)
$C_2$=(0.0581×$R_c$) with $R_c$ being the Reynolds number associated with the rotating member which equals $$\left(\frac{\omega r^2}{\eta}\right).$$

It should be noted that the use of boundary layer control member 6 is especially important when incorporated in an electric motor used in a compressor wherein the electric motor is surrounded by a gas with a density in the range of approximately one tenth the density of water. Of course, as indicated above, the optimum clearance will depend on the particular motor structure and environment of use. The necessary clearance distance can be readily determined by experimentation and should be within the ranges stated above and preferably equal to less than 10% of the radius of the rotating member.

Figure 3A:
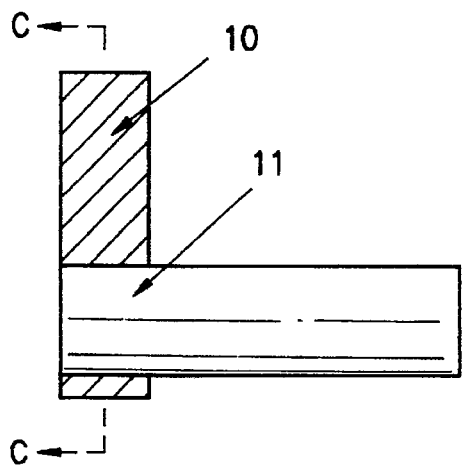
FIG. 3(a) is a partial, cross-sectional schematic view of a prior art counterweight assembly particularly adapted for use in a scroll fluid device.
Figure 3B:
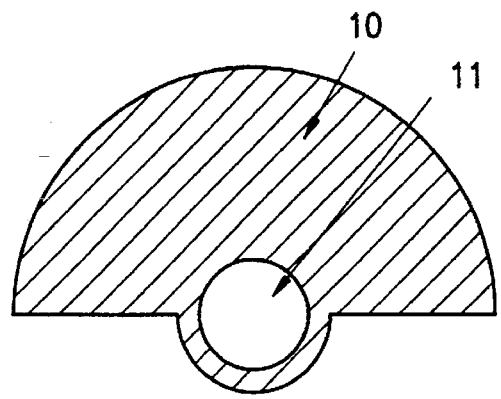
FIG. 3(b) is a cross-sectional view generally taken along line C—C in FIG. 3(a).
Figure 4A:
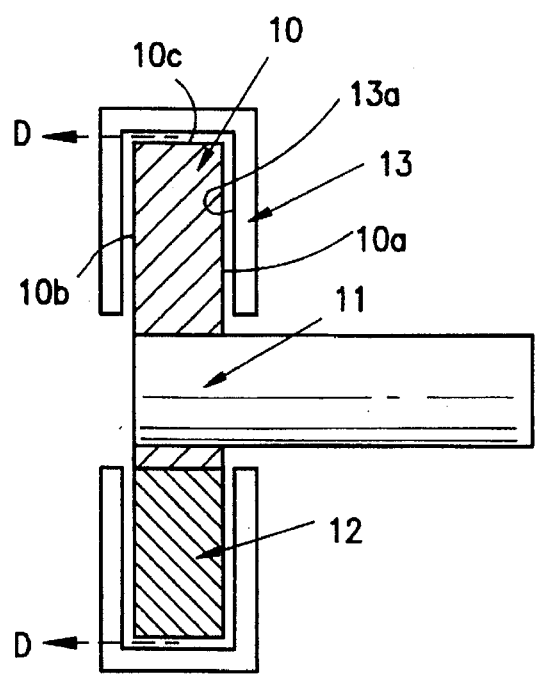
FIG. 4(a) is a partial, cross-sectional schematic side view of a counterweight assembly for use in a scroll fluid device which incorporates an aerodynamic drag reduction arrangement according to a second embodiment of the invention.
Figure 4B:
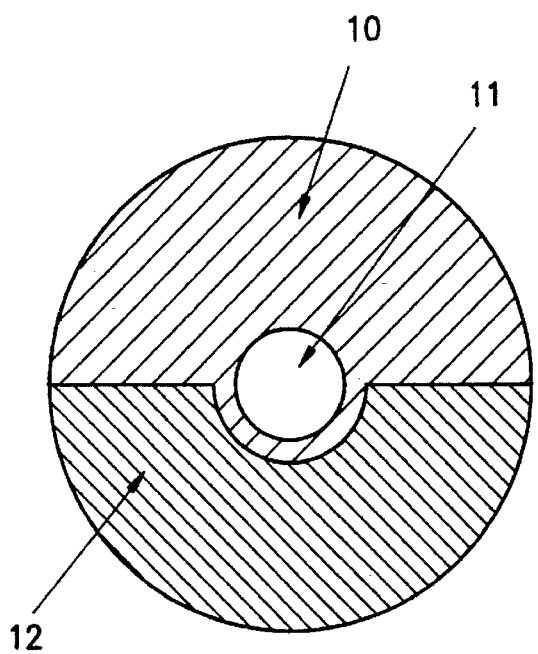
FIG. 4(b) is a cross-sectional side view generally taken along line D—D of FIG. 4(a).

Reference will now be made to FIGS. 4(a) and 4(b) in describing a drag reduction arrangement according to a second preferred embodiment of the invention. FIGS. 4(a) and 4(b) depicts a counterweight 10 that is adapted to be used in a scroll fluid device (not shown in these figures). Counterweight 10 is fixedly secured to a shaft 11 that is adapted to rotate in order to balance inertial forces developed by an orbiting scroll member. As stated above with respect to the description of FIGS. 3(a) and 3(b), a conventional counterweight is non-symmetrically constructed about its longitudinal axis of rotation. In the preferred embodiment shown in FIGS. 4(a) and 4(b), a filler material 12, of low density as compared to the material of counterweight 10, is added to counterweight 10 such that counterweight 10 and filler material 12 combine to extend symmetrically about the longitudinal axis of shaft 11. Filler material 12 may be fixedly secured to counterweight 10 in any manner known in the art, for example, through an adhesive. This arrangement results in a symmetric counterweight having a center of gravity that is offset from the longitudinal axis of shaft 11. It should be realized that filler material 12 need not actually be made separate from counterweight 10 but could be simply a lighter portion of counterweight 10 which equally results in the desired offset of the center of gravity.

As best shown in FIG. 4(a), counterweight 10 is substantially encapsulated by a boundary layer control member generally indicated at 13. Boundary layer control member 13 has an associated control surface 13a that extends annularly about axially spaced radially extending surfaces or sides 10a and 10b of counterweight 10 and along an outer radially spaced, peripheral surface 10c. Again, control surface 13a is preferably smooth and boundary layer control member 13 is preferably spaced so as to provide an optimum clearance between control surface 13a and counterweight 10. As discussed above, this optimum clearance can be readily determined by experimentation, as represented by the graph shown in FIG. 6, and falls within the range defined by the above formulas in order to assure laminar flow.

Figure 5:
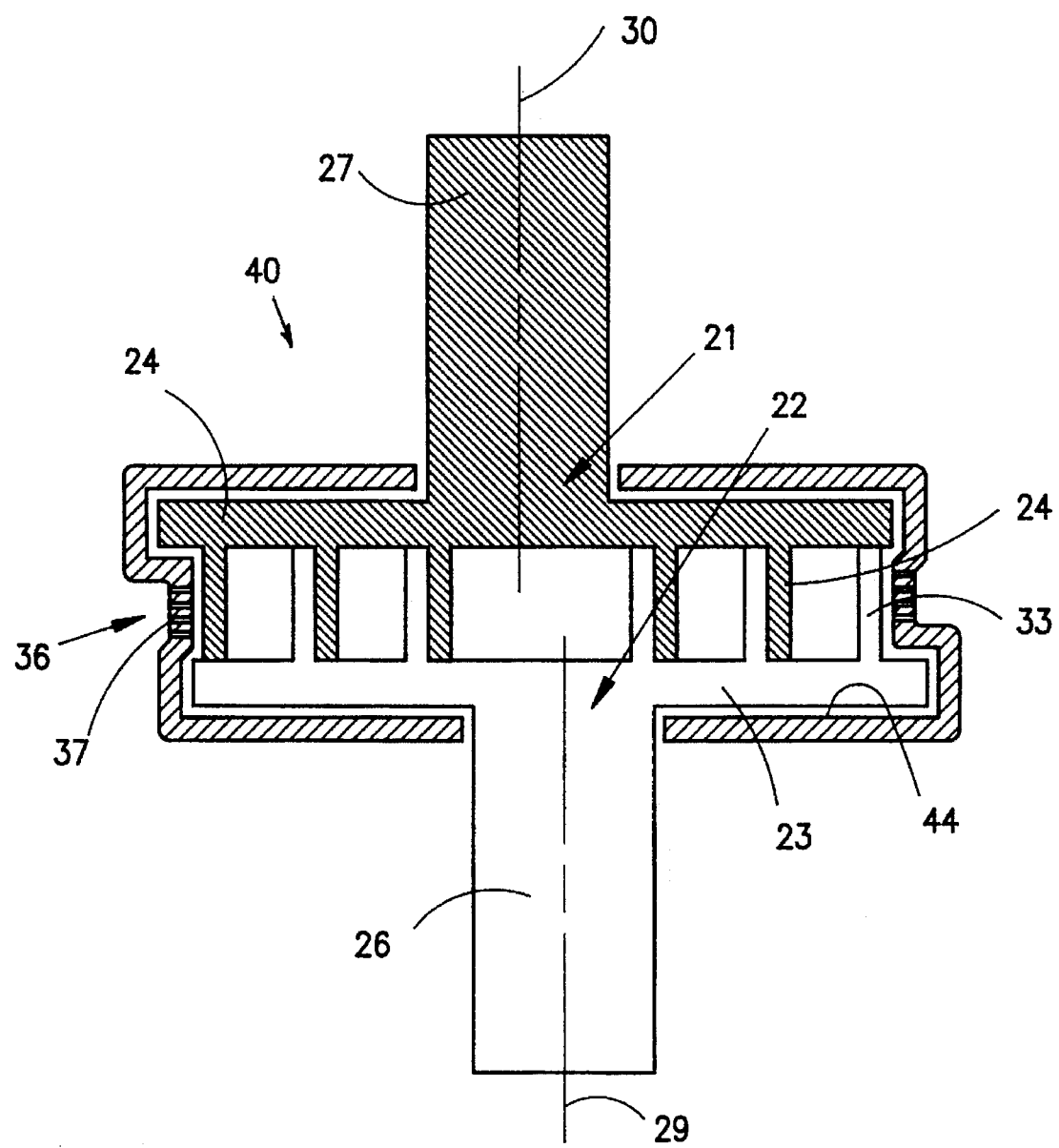
FIG. 5 is a cross-sectional side schematic view of a portion of a co-rotating scroll fluid device incorporating an aerodynamic drag arrangement according to a third embodiment of the invention.

Reference will now be made to FIG. 5 in describing a preferred embodiment of the invention wherein a boundary layer control member is incorporated in a co-rotating scroll fluid device. Co-rotating scroll fluid devices are widely known in the art. In general, co-rotating scroll fluid devices include a pair of meshed scroll elements as indicated in FIG. 5 at 21 and 22. Each scroll element 21, 22 includes an associated radially extending base plate 23, 24 that is fixedly secured to an associated shaft 26, 27 that are adapted to rotate about respective offset axes 29, 30. Base plates 23 and 24 are axially spaced and carry a pair of opposed, axially extending, meshed involute scroll wraps 33, 34 and terminate at radially located peripheral surfaces. Scroll elements 21 and 22 are adapted to be mounted in a housing (not shown) so as to orbit relative to each other about an orbit axis in order to generate fluid transport chambers having progressively and cyclically varying volumes between scroll wraps 33 and 34 that result from relative orbital motion of the scroll wraps 33, 34. If the relative orbital movement occurs in one direction, the scroll fluid device 5 will act as a compressor thereby drawing in fluid at a outer radial inlet port area generally indicated at 36 which will be compressed as it is transported radially inward to a central outlet port (not shown). Such a scroll fluid device can also act as an expander by drawing fluid into a centrally located opening and expanding the fluid radially outwardly to port area 36.

According to this embodiment of the invention, the boundary layer control member is generally indicated at 40 and extends annularly along base plate 24, across the outer peripheral portions of scroll elements 21 and 22 and fluid port area 36, and along opposed base plate 23. As shown in FIG. 5, boundary layer control member 40 follows the contours of scroll members 21 and 22 so as to define a predetermined, optimum clearance between scroll elements 21 and 22 and a control surface 44 of boundary layer control member 40.

In order for fluid to enter or leave the rotating scroll elements 21, 22 at peripheral fluid port area 36, boundary layer control member 40 is provided with a plurality of perforations 37. In the preferred embodiment, the perforated portion of boundary layer control member 40 extends about 360° of fluid port area 36. As stated above, it is desirable that fluid entering scrolls 21 and 22 should have as little angular momentum induced by the rotation of these elements as possible. Perforated boundary layer control member 40 accomplishes this effect. Finally, reference is again made to FIG. 6 in establishing, through experimentation, the optimum clearance between scroll elements 21 and 22 and control surface 44 of boundary layer control member 40.

Although described with respect to preferred embodiments of the present invention, it should be readily understood that various changes and/or modifications can be made to the invention without departing the spirit thereof. In general, the invention is only intended to be limited by the scope of the following claims.

I claim:

1. In a device having at least one member adapted to rotate at a high speed about a longitudinal axis and which has a circular cross-section intersecting a plane perpendicular to said longitudinal axis with an outer radially spaced peripheral surface, a boundary layer control arrangement for reducing aerodynamic drag comprising a control member including a control surface extending adjacent the outer peripheral surface of said at least one member with a predetermined, substantially uniform clearance (d) therebetween, said clearance (d) being defined as follows:

$$\left(\frac{C_1 \eta}{\omega \, r^{1/2}}\right)^{2/3} < d < \left(\frac{C_2 \eta}{\omega \, r^{1/2}}\right)^{2/3}$$

wherein:

d=clearance between control surface and the rotating member (ft.)

η=viscosity of fluid within which the member rotates (ft²/sec)

ω=angular velocity of said at least one member (rad/sec)

r=radius of the rotating member (ft)

$C_1$=500 (non-dimensional Taylor number)

$C_2$=(0.0581×$R_c$) with $R_c$ being the Reynolds number associated with the rotating member which equals $$\left(\frac{\omega \, r^2}{\eta}\right).$$

2. A boundary layer control arrangement as claimed in claim 1, wherein said control member is fixed.

3. A boundary layer control arrangement as claimed in claim 1, wherein said clearance is less than 10% of the radius (r) of said at least one member.

4. A boundary layer control arrangement as claimed in claim 1, wherein said device comprises an electric motor and said at least one member constitutes a rotor, said device further comprising a fixed stator extending about the outer radial surface of said rotor, said control member being secured to said stator between said rotor and said stator.

5. A boundary layer control arrangement as claimed in claim 4, wherein said stator is formed with a plurality of circumferentially spaced, winding receiving slots that open in the direction of said rotor, said control member extending across said slots.

6. A boundary layer control arrangement as claimed in claim 4, wherein said control member further extends adjacent to axially spaced surfaces of said rotor.

7. A boundary layer control arrangement as claimed in claim 6, wherein said device further includes a shaft fixed for rotation with said rotor and a beating unit for rotatably supporting said rotor, said bearing unit being positioned along said shaft adjacent one of the axially spaced surfaces of said rotor, said control member being attached to at least a portion of said bearing unit.

8. A boundary layer control arrangement as claimed in claim 1, wherein said device comprises a scroll fluid device including at least a pair of rotatable, axially spaced, radially extending surfaces and at least one rotatable peripheral surface, and said control member surrounds said at least one member by extending annularly across one of said axially spaced surfaces, along said peripheral surface and across another one of said axially spaced surfaces.

9. A boundary layer control arrangement as claimed in claim 8, wherein said at least one member comprises a counterweight eccentrically fixedly secured to a shaft that is centered on said longitudinal axis.

10. A boundary layer control arrangement as claimed in claim 8, wherein said at least one member comprises a counterweight fixedly secured to a shaft that is centered on said longitudinal axis but which has an associated center of gravity that is offset from said longitudinal axis.

11. A boundary layer control arrangement as claimed in claim 8, wherein said at least one member constitutes a first scroll element and said scroll fluid device further includes a second scroll element, each of said first and second scroll elements including a base plate supporting an involute scroll wrap, the involute scroll wraps of said first and second scroll elements being opposed, meshed and mounted for relative orbital movement so as to generate fluid transport chambers having progressively and cyclically varying volumes therebetween, said scroll fluid device having an associated fluid port at said peripheral surface, said base plates including said axially spaced, radially extending surfaces and said peripheral surface, said control member extending annularly along the base plate of said first scroll element, across said fluid port and along the base plate of said second scroll element.

12. A boundary layer control arrangement as claimed in claim 11, wherein said control member is perforated, at least along the portion thereof that extends across said fluid port.

* * * * *